Patented July 3, 1934

1,965,490

UNITED STATES PATENT OFFICE 1,965,490

PROCESS OF MAKING MARGARIN AND COMPOSITION USED THEREIN

James W. Conway and Armand May, Atlanta, Ga., assignors to American Lecithin Corporation, Atlanta, Ga., a corporation of Delaware No Drawing. Application October 22, 1930, Serial No. 490,537

6 Claims. (Cl. 99—13)

The present invention relates to the production of margarin of improved quality, by the churning process, and includes certain products and intermediate products as described below.

Prior to our present invention, a process has been proposed for making margarin in which lecithin is hydrated by being shaken up with water, the emulsion added to milk or skimmed milk and emulsified thoroughly, the amount of the lecithin being about 0.5% up to 1%, fat of the kind ordinarily used in making margarin is then added, for example in amount substantially equal to the quantity of the milk, the mixture thoroughly emulsified, and then allowed to ripen, for example by adding a small amount of sour milk and allowing the souring to continue until it has reached approximately the customary degree of ripeness of cream, for churning. The mixture is then churned in the same way as ripened cream is churned, it is then worked and washed, and salted if necessary, to produce a very desirable quality of margarin. It was found however that a considerable proportion of the lecithin added in such a process may be washed out or may remain in the aqueous material which is separated from the butter-like material during or after the churning, and for this reason it was necessary to add from 50 to 100% more lecithin than was desired in the final product. For example if 0.3% was desired in the final product it would be necessary to add from 0.45% up to 0.6% of lecithin, in the process of the said copending application. Since lecithin is a relatively expensive material and since the recovery of this amount of lecithin from the aqueous material would involve considerable difficulty, efforts have now been made to reduce this loss.

After considerable research it has now been found that if the lecithin is added in the form of a homogeneous mixture of lecithin and dried milk, and amount of lecithin so lost can be very substantially reduced.

The following example is given as illustrative of the present invention, but it is to be understood that the invention is not restricted to this specific example.

250 pounds of ripened skimmed milk, are placed in a vat, then about 750 pounds of melted margarin fat are added and the mixture is emulsified to form a creamy mass. Then dry milk containing lecithin is added, in such amounts as to contain about 3 pounds of lecithin of about 60% purity (equal to about 2 pounds of actual lecithin). The mixture is then churned as in the ordinary churning of ripened cream during which operation there is some separation of aqueous material. It is found that the amount of lecithin going into the aqueous material and separated is substantially lower than the above mentioned application. The amount of skimmed milk can be varied between about 25% and about 50% of the amount of margarin fat. In a modification the lecithin and dry milk product can be added to the milk or added to the oil, before mixing the milk and oil together. Instead of skimmed milk, whole milk or buttermilk can be used, and this can be sweet or partially sour, and the souring can be performed or completed after the mixing. The lecithin and dry milk product can be added to the material before or after the souring, or can be added just as the mixture goes into the churn or after the mixture has been placed in the churn.

For producing the mixture of lecithin with milk powder, it is preferable to add the lecithin during or before the drying operation. For example the milk can be first concentrated to contain about 30 or 35% of milk solids, the lecithin then mixed with the same and passed through a homogenizer, and the drying then completed by the vacuum drum method, the spray method, the impact method or other methods, but care should be taken not to heat the mixture to such an extent as to decompose any substantial amount of the lecithin, and the drying is accordingly preferably performed under a rather high vacuum and at a low temperature.

While as stated above, the amount of lecithin which is lost by going into the aqueous material is substantially lower than in the process of the copending case above referred to, still it is advisable to add a little more lecithin than is needed in the final margarin, for the reason that some may be washed out or worked out in the water. The material from the churn can be run into ice water or refrigerating brine, for chilling and working the same, or can be run onto chill rolls and subsequently worked, with or without water.

It will be understood that in making dry milk the usual procedure is to concentrate and dry skimmed milk. However the milk can be wholly or partially skimmed, or may be partially soured or if desired buttermilk or similar product may be employed. The amount of lecithin added may be equal to from 30% to 100% of the milk solids.

The addition of lecithin in the manner here indicated increases and improves the aroma and flavor, and hence the amount of milk to be incorporated with the margarin fat can be very considerably reduced.

Reference is made above to to the fact that the lecithin preferably employed was of about 60% purity. Lecithin purified to a much higher degree than this does not keep well. The lecithin can be wholly separated from the natural oil occurring therewith, and can be then incorporated with purified fatty oil, cocoanut oil, cocoanut butter, sesame oil, cottonseed oil, highly refined soybean oil or other refined oils or fats or mixtures thereof. Preferably the lecithin is sold and used containing about 55 to 60% of actual lecithin.

The addition of the lecithin to dry milk; or the production of an intimate mixture of lecithin with dry milk solids is of special advantage for the reason that it substantially improves the stability of the lecithin. The stated results may be in part due to the reaction taking place between the lecithin and the casein in the milk solids, but it is not desired to restrict the invention to this particular theory.

The lecithin preferably used is that produced from soybeans, for example in accordance with the Bollmann process. However if desired lecithin produced from dried buttermilk and similar products can be employed.

In connection with the dry milk and lecithin mixture, it is not necessary that every trace of water be removed, and in fact it is indicated that mixtures of concentrated milk and lecithin, whether sweetened or not, show a substantial improvement in the keeping quality of the lecithin, and in some other directions.

Thus for example milk which has been concentrated to 30 or 40% of milk solids, either with or without the addition of sugar can be incorporated homogeneously with an amount of lecithin equal to 10 to 50% of the milk solids, producing a stable homogeneous mixture, after emulsification or homogenization, and this mixture can be employed as such for many purposes.

Among the uses of the composition containing milk solids and lecithin, the following are particularly mentioned: for incorporation into ice cream, for incorporation into chocolate masses, for incorporation into bread, cakes and pastry or into shortening agents used therein, and for incorporation into artificial butter, modified butter or butter substitutes.

Reference has been made above to using lecithin of about 60% purity, the balance being pure oils, fats, etc. It will be understood that the oil can be more completely removed if desired, to produce a product of a purity up to about 95% and this purified lecithin can then be admixed with the milk or milk powder, and the mixture added into the manufacture of the margarin.

It is most advisable, if the lecithin is to be put up with liquid milk products, to use concentrated milk (whole milk or skimmed milk or sometimes buttermilk) which may contain added sugar or not as desired, and it is found that for making such mixtures, which will keep for a considerable period without souring, the milk does not have to be concentrated to such a high degree as would be necessary if the lecithin were not to be added. It is advisable, say in the case of concentrated, unsweetened skimmed milk, to concentrate same to above 25% of total solids. The amount of lecithin so added can conveniently be such that the product will contain, say 25% of lecithin. Such a product will keep (in unsealed containers) without souring, for a month or more. The lecithin can be melted, at the lowest possible temperature, emulsified in the milk, and then passed through a homogenizer or colloid mill, which renders the emulsion very permanent.

What is claimed is—

1. In the making of margarin by churning a mixture of ripened milk material and margarin fats, the step of adding to said materials, at any stage of the process, a mixture of dried milk material and added lecithin, whereby a large part of the lecithin so added is taken up and held by the margarin.

2. In the making of margarin by churning a mixture of ripened milk material and margarin fats, the step of adding to said materials, at any stage of the process, a mixture of dried skim milk and added lecithin, whereby a large part of the lecithin so added is taken up and held by the margarin.

3. In the making of margarin by churning a mixture of ripened milk material and margarin fats, the step of adding to said materials, at any stage of the process, a mixture of dried buttermilk and added lecithin, whereby a large part of the lecithin so added is taken up and held by the margarin.

4. A process which comprises incorporating lecithin into milk, at before the end of the drying process, drying the milk and lecithin mixture at a temperature too low to substantially injure the lecithin, and adding such product into the materials used in making margarin by the churning process.

5. Concentrated skim milk, having at least 25% total solids of milk, containing a substantial percentage of added lecithin, which lecithin is thoroughly incorporated with the concentrated milk.

6. Dried skim milk carrying incorporated therewith at least 30% of lecithin.

JAMES W. CONWAY.
ARMAND MAY.